(12) United States Patent
Yagi et al.

(10) Patent No.: US 11,159,548 B2
(45) Date of Patent: Oct. 26, 2021

(54) ANALYSIS METHOD, ANALYSIS DEVICE, AND ANALYSIS PROGRAM

(71) Applicant: NIPPON TELEGRAPH AND TELEPHONE CORPORATION, Chiyoda-ku (JP)

(72) Inventors: Takeshi Yagi, Musashino (JP); Daiki Chiba, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 241 days.

(21) Appl. No.: 16/064,075

(22) PCT Filed: Feb. 13, 2017

(86) PCT No.: PCT/JP2017/005180
§ 371 (c)(1),
(2) Date: Jun. 20, 2018

(87) PCT Pub. No.: WO2017/145843
PCT Pub. Date: Aug. 31, 2017

(65) Prior Publication Data
US 2019/0007439 A1    Jan. 3, 2019

(30) Foreign Application Priority Data

Feb. 24, 2016  (JP) ............................. JP2016-033637

(51) Int. Cl.
*H04L 29/06*    (2006.01)
*G06F 16/28*    (2019.01)
*G06F 16/951*   (2019.01)

(52) U.S. Cl.
CPC ........ *H04L 63/1425* (2013.01); *G06F 16/285* (2019.01); *G06F 16/951* (2019.01);
(Continued)

(58) Field of Classification Search
CPC . G06F 16/951; G06F 16/285; H04L 63/1433; H04L 63/1425; H04L 63/1491; H04L 63/1416
See application file for complete search history.

(56) References Cited

U.S. PATENT DOCUMENTS

2009/0327224 A1* 12/2009 White .................. G06F 16/951

FOREIGN PATENT DOCUMENTS

| JP | 2007-295056 A | 11/2007 |
| JP | 2013-85124 A  | 5/2013  |

OTHER PUBLICATIONS

Katerina Goseva-Popstojanova—NPL Jul. 2012 (Year: 2015).*

(Continued)

*Primary Examiner* — Tri M Tran
(74) *Attorney, Agent, or Firm* — Oblon, McClelland, Maier & Neustadt, L.L.P.

(57) ABSTRACT

A network standpoint feature value creating unit classifies access data collected at observation points into each detection target access source and creates network standpoint feature values for each of the detection target access sources. An access source detection unit detects, based on the network standpoint feature value, an access source performs a predetermined continuous access. A point standpoint feature value creating unit creates detection target standpoint feature values that are feature values for each access data collected at an observation point and training standpoint feature values that are feature values for each access data of the access source detected by the access source detection unit. An access detection unit detects access data in which the similarity between the detection target standpoint feature value and the training standpoint feature value is not less than a predetermined value as access data by the predetermined continuous access.

5 Claims, 14 Drawing Sheets

(52) U.S. Cl.
CPC ...... *H04L 63/1416* (2013.01); *H04L 63/1433* (2013.01); *H04L 63/1491* (2013.01)

(56) References Cited

OTHER PUBLICATIONS

Kuze Naomi et al.—NPL Dec. 2015 (Year: 2012).*
Extended European Search Report dated Jun. 28, 2019 in Patent Application No. 17756284.0, 8 pages.
Kuze, N. et al. "Crawler Classification using Ant-based Clustering Scheme" The 10$^{th}$ International Conference for Internet Technology and Secured Transactions (ICITST-2015), XP032869667, 2015, pp. 84-89.
Goseva-Popstojanova, K. et al. "Classification of malicious Web sessions" 21$^{st}$ International Conference on Computer Communications and Networks (ICCCN), XP032229735, 2012, 9 pages.
Almotairi, S. et al. "A Technique for Detecting New Attacks in Low-Interaction Honeypot Traffic" 4$^{th}$ International Conference on Internet Monitoring and Protection, XP031476212, 2009, 7 pages.
John P. John, et al., "Heat-seeking Honeypots: Design and Experience," Proceedings of the 20$^{th}$ International Conference World Wide Web, Mar. 2011, 10 pages.
Davide Canali, et al., "Behind the Scenes of Online Attacks: an Analysis of Exploitation Behaviors on the Web," Proceedings of 20$^{th}$ Annual Network & Distributed System Security Symposium (NDSS 2013), Feb. 2013, 18 pages.
Terry Nelms, et al., "ExecScent: Mining for New C&C Domains in Live Networks with Adaptive Control Protocol Templates," Proceedings of the 22nd USENIX Conference Security Symposium, Aug. 2013, 17 pages.
Daiki Chiba, et al., "Design and Evaluation of a Profiling Method to Detect Post-Infection Communications," Computer Security Symposium 2014, Oct. 2014, pp. 960-967, (with English abstract).
International Search Report dated Apr. 25, 2017 in PCT/JP2017/005180 filed Feb. 13, 2017.

* cited by examiner

Infection Communications", Computer Security Symposium 2014, 2014 (2) pp. 960-967, October, 2014

ANALYSIS METHOD, ANALYSIS DEVICE, AND ANALYSIS PROGRAM

FIELD

The present invention relates to an analysis method, an analysis device, and an analysis program.

BACKGROUND

In recent years, with a spread of infrastructure of the Internet and Web services, attacks against Web servers that provide such services is rapidly increased. Furthermore, cyberterrorism that attacks, via Web, specific groups, such as governments or corporations, is increased, thus resulting in social issues and political issues.

Conventionally, as a method of detecting an attack to such a Web site, there is a known method of using signatures created by analyzing vulnerability of software and there is a known method of collecting and detecting attacks. Considering explosive growth of Web applications in recent years, because it is difficult to comprehensively perform the former, a method of setting up Web server type honeypots or the like and collecting and analyzing behaviors of attacks is taken.

An example of a method of collecting and analyzing attacks includes a method of capturing traffic by user PCs or servers; however, with this method, high detection accuracy can be expected but there is a need to consider privacy issues or capture of traffic affecting the quality of services, thus resulting in limitations on environment in which the method can be used.

Consequently, it is important to set up a system that collects attacks against Web sites (Web server type honeypots) and consider a method of checking actual behaviors of the attacks (for example, Non-Patent Documents 1 and 2). A honeypot is a decoy system constructed in accordance with the target of attack and Web server type honeypots are used when attacks on Web sites are collected.

Honeypot are widely categorized as low-interaction honeypots that are generally emulators and high-interaction honeypots that use actual OSs or applications. In particular, high-interaction honeypots that are hard for attackers to detect to be decoys and that can collect a large number of pieces of information are used for attacks against Web sites.

CITATION LIST

Non-Patent Document

Non-Patent Document 1: J. P. John, F. Yu, Y. Xie, A. Krishnamurthy, and M. Abadi, "Heat-seeking honeypots: Design and experience" in Proceedings of the 20th International Conference on World Wide Web, March 2011.

Non-Patent Document 2: D. Canali and D. Balzarotti, "Behind the scenes of online attacks: an analysis of exploitation behaviors on the web" in Proceedings of 20th Annual Network & Distributed System Security Symposium (NDSS 2013), February 2013.

Non-Patent Document 3: T. Nelms, R. Perdisci, and M. Ahamad, "ExecScent: mining for new C&C domains in live networks with adaptive control protocol templates" Proc. 22nd USENIX Conf. Secur., pp. 589-604, August 2013.

Non-Patent Document 4: Daiki Chiba, Takeshi Yagi, Mitsuaki Akiyama, Kazufumi Aoki, Takeo Hariu, "Design and Evaluation of a Profiling Method to Detect Post-Infection Communications", Computer Security Symposium 2014, 2014 (2) pp. 960-967, October, 2014

SUMMARY

Technical Problem

However, in the conventional technology, there is a problem in that it is difficult to perform detection, from limited information, while distinguishing communication performed by an attack from normal communication similar to the communication performed by the attack.

For example, normal communication is sometimes performed on a honeypot by crawlers in order to create search engine databases. Because the communication performed by crawlers is similar to a vulnerability scan that checks vulnerability of Web sites in terms of attempting to input various input values to various programs, it is difficult to detect a vulnerability scan from limited information obtained from single piece of communication or a single server while distinguishing the communication performed by crawlers from the vulnerability scan.

Solution to Problem

To solve a problem and to achieve an object, an analysis method performed by an analysis device, the analysis method includes: a network standpoint feature value creating step of classifying first access data that is collected at a plurality of observation points in a network and that is related to an access to a server in the network into each detection target access source that is an access source of the access and creating network standpoint feature values that are feature values of the first access data for each of the detection target access sources;

an access source detecting step of detecting, based on the network standpoint feature values, from among the detection target access sources, an access source that performs a predetermined continuous access;

a point standpoint feature value creating step of creating detection target standpoint feature values that are feature values for each piece of second access data that is collected at a single observation point in the network and that is related to an access to a server in the network and training standpoint feature values that are feature values for each piece of the first access data in which, from among pieces of the first access data, an access source is the access source detected at the access source detecting step; and an access detecting step of detecting, from among pieces of the second access data, the second access data in which the similarity between the detection target standpoint feature value and the training standpoint feature value is equal to or greater than a predetermined value as access data related to the predetermined continuous access.

An analysis device includes: a network standpoint feature value creating unit that classifies first access data that is collected at a plurality of observation points in a network and that is related to an access to a server in the network into each detection target access source that is an access source of the access and that creates network standpoint feature values that are feature values of the first access data for each of the detection target access sources;

an access source detection unit that detects, based on the network standpoint feature values, from among the detection target access sources, an access source that performs a predetermined continuous access;

a point standpoint feature value creating unit that creates detection target standpoint feature values that are feature values for each piece of second access data that is collected at a single observation point in the network and that is related to an access to a server in the network and training standpoint feature values that are feature values for each piece of the first access data in which, from among pieces of the first access data, an access source is the access source detected by the access source detection unit; and an access detection unit that detects, from among pieces of the second access data, the second access data in which the similarity between the detection target standpoint feature value and the training standpoint feature value is equal to or greater than a predetermined value as access data related to the predetermined continuous access.

An analysis program that causes a computer to execute a process includes: a network standpoint feature value creating step of classifying first access data that is collected at a plurality of observation points in a network and that is related to an access to a server in the network into each detection target access source that is an access source of the access and creating network standpoint feature values that are feature values of the first access data for each of the detection target access sources;

an access source detecting step of detecting, based on the network standpoint feature values, from among the detection target access sources, an access source that performs a predetermined continuous access;

a point standpoint feature value creating step of creating detection target standpoint feature values that are feature values for each piece of second access data that is collected at a single observation point in the network and that is related to an access to a server in the network and training standpoint feature values that are feature values for each piece of the first access data in which, from among pieces of the first access data, an access source is the access source detected at the access source detecting step; and an access detecting step of detecting, from among pieces of the second access data, the second access data in which the similarity between the detection target standpoint feature value and the training standpoint feature value is equal to or greater than a predetermined value as access data related to the predetermined continuous access.

Advantageous Effects of Invention

According to the present invention, it is possible to detect, from limited information, communication performed by an attack while distinguishing the communication performed by the attack from normal communication that is similar to the communication performed by the attack.

DESCRIPTION OF EMBODIMENTS

Preferred embodiments of an analysis method, an analysis device, and an analysis program disclosed in the present invention will be described in detail below with reference to the accompanying drawings. The present invention is not limited to the embodiments.

First Embodiment

First, the configuration of the analysis device according to a first embodiment, the flow of processes, and the effects will be described. Furthermore, as described above, honeypots are categorized as low-interaction honeypots that are emulators and high-interaction honeypots that use actual OSs or applications; however, it is assumed that the honeypots in the embodiment are high-interaction and Web server type honeypots.

Configuration in the First Embodiment

Figure 1:
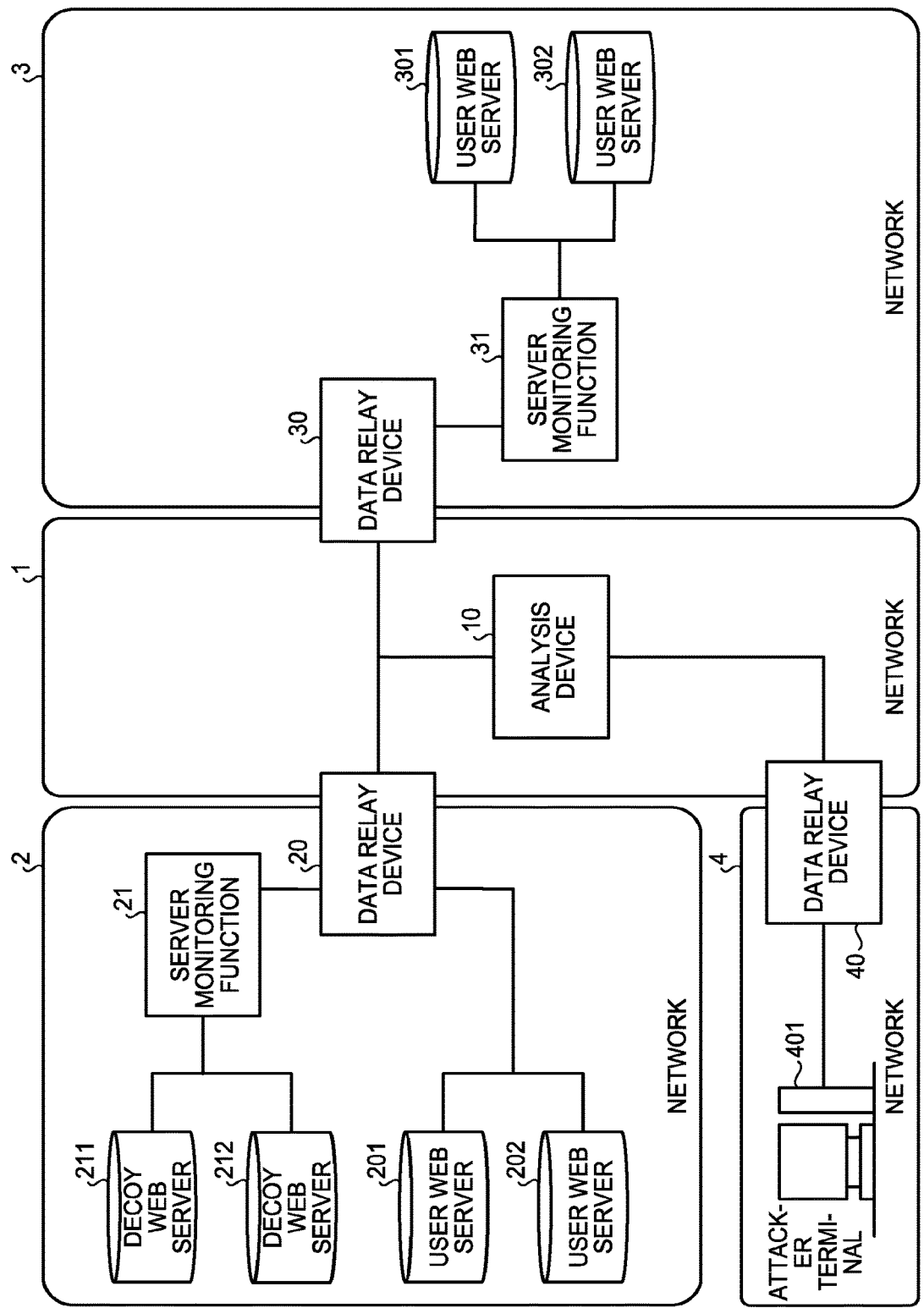
FIG. 1 is a diagram illustrating an example of the configuration of a network in which an analysis device according to a first embodiment is provided.

The configuration of a network in which an analysis device according to the first embodiment is provided will be described with reference to FIG. 1. FIG. 1 is a diagram illustrating an example of the configuration of the network in which the analysis device according to the first embodiment is provided.

A network 1 accommodates networks 2 to 4 by way of data relay devices 20, 30, and 40. Here, the data relay devices 20, 30, and 40 are, for example, general routers, switches, gateway devices, or the like. Furthermore, the network 1 is, for example, a wide area network, such as the Internet. Furthermore, the networks 2 to 4 are networks or the like that are constructed in an environment of a local area network (LAN), a home network, or cloud computing.

The data relay device 20 accommodates user Web servers 201 and 202 received from customers and further accommodates decoy Web servers 211 and 212 by way of a server monitoring function 21. Furthermore, the server monitoring function 21 may also be arranged outside the data relay device 20 or may also be arranged inside the data relay device 20 as a function of the data relay device 20. Furthermore, for example, the decoy Web servers 211 and 212 function as honeypots.

Furthermore, if a single physical interface is used for the server monitoring function 21, the decoy Web server 211, and the decoy Web server 212, plurality of physical interfaces may also be implemented by connecting the physical, links connected to the devices to a transfer device, such as a router, a switch, or a hub. Furthermore, if a plurality of physical interfaces is used for each of the devices, the server monitoring function 21 can be connected to the decoy Web server 211 and the decoy Web server 212 by physical links in a hub and spoke shape. This also applies to the data relay device 20, the user Web server 201, and the user Web server 202.

Furthermore, the data relay device 30 accommodates user Web servers 301 and 302 by way of a server monitoring function 31. Furthermore, the number of servers arranged in each network and the number of servers accommodated by each of the data relay devices are not limited to the example illustrated in FIG. 1 and an arbitrary number of servers can be used. Furthermore, the type of arranged servers may also be only the user Web servers or only the decoy Web servers. Furthermore, in the network 1, an attacker terminal 401 that is used by an attacker who tries illegal accesses is accommodated by way of the data relay device 40.

An analysis device 10 analyzes access data related to an access to each server. The analysis device 10 is arranged in the network 1 and is connected, by online, to each of the data relay devices having a function of monitoring each servers or an access to each server. Furthermore, the arrangement of the analysis device 10 is not limited to the example illustrated in FIG. 1. For example, the analysis device 10 may also be arranged in an independent network and access data collected by each of the data monitoring devices may also be received by offline. The analysis device 10 creates feature values from the access data.

Figure 2:
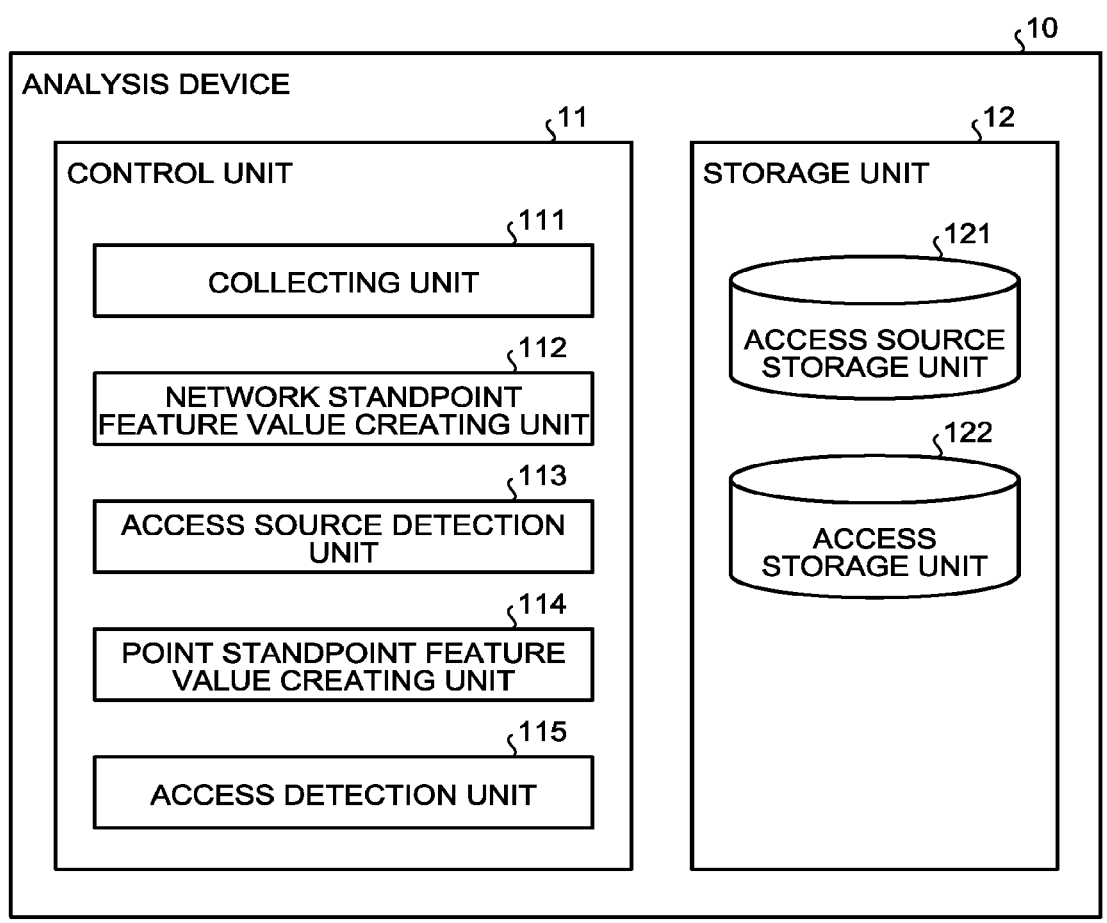
FIG. 2 is a diagram illustrating an example of the configuration of the analysis device according to the first embodiment.

The configuration of the analysis device 10 will be described by using FIG. 2. FIG. 2 is a diagram illustrating an example of the configuration of the analysis device according to the first embodiment. As illustrated in FIG. 2, the analysis device 10 includes a control unit 11 and a storage unit 12. Furthermore, the control unit 11 includes a collecting unit 111, a network standpoint feature value creating unit 112, an access source detection unit 113, a point standpoint feature value creating unit 114, and an access detection unit 115. Furthermore, the storage unit 12 includes an access source storage unit 121 and an access storage unit 122.

The collecting unit 111 collects access data from each of the data relay devices. Each of the data relay devices monitors the Web servers, the decoy Web servers, and the accesses to each of the servers and collects access data. The access data collected by each of the data relay devices depends on which information is used for a feature value. For example, each of the data relay devices collects URLs or methods described in request fields in HTTP request messages; User-Agent or Referer described in header fields; transmission source IP addresses, destination IP addresses, transmission source port numbers, destination port numbers, protocol numbers described in body fields; the lengths of body fields at the time of POST method; and the like.

The network standpoint feature value creating unit 112 classifies first access data that is collected at a plurality of observation points in a network and that is related to an access to a servers in the network into each detection target access source that is an access source of the access and creates network standpoint feature values that are feature values of the first access data for each of the detection target access sources. Here, the plurality of observation points is, for example, the data relay devices 20, 30, and 40 illustrated in FIG. 1. Furthermore, the first access data is, for example, the access data collected in the network 1 illustrated in FIG. 1.

At this time, the network standpoint feature value creating unit 112 may also use one of the transmission source address, the address block, and the address management company of a packet as the detection target access source and may also include, in the network standpoint feature value, at least one of statistical information on the packet sizes, statistical information on the packet arrival intervals, statistical information on the number of packets, statistical information on the port numbers, the continuity of the port numbers, and the continuity of the destination addresses.

Specifically, the network standpoint feature value creating unit 112 groups, in units of access sources, the access data collected by the collecting unit 111 and creates network standpoint feature information in the group. Furthermore, the network standpoint feature value creating unit 112 may also create the feature values based on additional information that is created from the information collected by the collecting unit 111.

For example, the network standpoint feature value creating unit 112 may also represent the request URLs, the User-Agnet, the Referer collected by the collecting unit 111 by regular expression as access data and may also extract feature values from the regular expressions. At this time, the network standpoint feature value creating unit 112 may also use, as the feature value, the average of the length of the character strings, the number of hierarchies of paths in URLs, the number of attributes of queries, and the number of characters for each hierarchy or attribute that are obtained before the regular expression or may also use, as the feature value, the data type included in the data that has been subjected to the regular expression and the ratio thereof (for example, see Non-Patent Document 3).

Furthermore, the network standpoint feature value creating unit 112 may also acquire, based on the IP addresses, information on subnets, AS numbers, companies, and countries and use the acquired information as the feature values. In addition, the network standpoint feature value creating unit 112 may also add, as the feature value, information indicating whether a port number is a well-known port, a reserved port, or a private port or may also add, as the feature value, information indicating whether a port is a specific port.

Furthermore, the network standpoint feature value creating unit 112 may also add, to the feature value, the status code, the type of content, the text type of content (HTML, CSS, etc.), and the character code of a text (UTF-8, ISO-8859-1, etc.) that are described in a response field in an HTTP response message or a behavior of the Web server or the decoy Web server exhibited after the reception of a request. Furthermore, regarding a port number, the network standpoint feature value creating unit 112 may also add, to the feature value, all or a part of information indicating whether continuity can be found in a statistical value of the packet size of a packet group sent from the same address, a statistical value of the packet arrival intervals, a statistical value of the number of arrival packets, periodical features, and port numbers or continuity can be found in transmission destination IP addresses.

Furthermore, the network standpoint feature value creating unit 112 may also add, regarding the Web servers and the decoy Web servers targeted for analyzing the access data, information indicating whether accesses are performed in the order of the IP addresses held by each of the servers; whether, in this case, the same port numbers are used; whether the port numbers are regularly increased or decreased; or the like to the feature value.

Furthermore, the network standpoint feature value creating unit 112 may also use, as a feature value, for example, the ratio of an error code responded from a honeypot. Furthermore, the network standpoint feature value creating unit 112 may also use the access source IP address as a unit of access source, may also use the AS number as a unit of access source measurement, or may also use the address block as a unit of access source measurement.

Furthermore, if a statistical value of a packet arrival interval is used as a feature value, the network standpoint feature value creating unit 112 sorts communication log sets by the arrival time of the HTTP requests and divides the communication log sets sorted in the order of arrival time into each time slot Δt. Here, it is known that a crawler that periodically sends communication requests and a vulnerability scan that sends communication requests in a burst manner show different tendencies in terms of the arrival of an HTTP request. Thus, the network standpoint feature value creating unit 112 can extract, based on the number of arrivals of requests in each slot or based on the number of slots in which the arrival requests are present, the feature values related to the number of arrivals of requests, arrival intervals, periodicity, and burst tendencies. Furthermore, the network standpoint feature value creating unit 112 may also directly use numeric values of the arrival intervals as the feature values.

Furthermore, in a vulnerability scan, a communication request is sometimes continuously sent to numerically continuous IP addresses. Thus, the network standpoint feature value creating unit 112 may also use, as the feature values based on the communication log sets sorted in the order of the arrival time of the HTTP requests, the results obtained by analyzing the continuity of the transmission destination IP addresses with respect to the order of the arrivals of requests.

The access source detection unit 113 detects, based on the network standpoint feature values, from among the detection target access source, the access source that performs a predetermined continuous access. For example, the access source detection unit 113 detects the access source that performs continuous accesses by a vulnerability scan or detects the access source that performs continuous accesses by a crawler.

The point standpoint feature value creating unit 114 creates detection target standpoint feature values that are feature values for each piece of second access data that is collected at a single observation point in the network and that is related to an access to a server in the network and training standpoint feature values that are feature values for each piece of first access data in which, from among the pieces of the first access data, an access source is the access source detected by the access source detection unit 113. Here, the single observation point is, for example, the data relay device 20 illustrated in FIG. 1. Furthermore, the second access data is, for example, the access data collected by the network 2 illustrated in FIG. 1.

For example, if the attacker terminal 401 illustrated in FIG. 1 is detected by the access source detection unit 113 as the access source that performs continuous accesses by a vulnerability scan, the feature values corresponding to each piece of the access data that is related to an access of the access source of the attacker terminal 401 and that is collected by the data relay devices 20, 30, and 40 are the training standpoint feature values. Furthermore, at this time, for example, each of the feature values of the access data collected by the data relay device 20 corresponds to the detection target standpoint feature values.

Furthermore, the point standpoint feature value creating unit 114 may also include, in each of the detection target standpoint feature values and each of the training standpoint feature values, at least one of a set of a request field, a header field, and a body field in an HTTP request message; a set of a request field, a header field, and a body field in an HTTP response message; address information on a packet; and port number information on the packet.

In the following, point standpoint feature values including detection target standpoint feature values and training standpoint feature values will be described. The network standpoint feature value is a feature value for each access source, whereas, the point standpoint feature value is a feature value for each access. Namely, the access data related to an access to a single Web server or decoy Web server is targeted for extracting the point standpoint feature value.

Specifically, the point standpoint feature value creating unit 114 creates feature values based on the access data collected by the collecting unit 111 or based on the access data that is the detection target. Furthermore, the point standpoint feature value creating unit 114 may also create point standpoint feature values based on the same information on the network standpoint feature values or may also create point standpoint feature values based on the information different from that of the network standpoint feature value.

An example in which the point standpoint feature value creating unit 114 creates feature values from the request URL "http://www.example.com/test/index.php?id=1" will be described. Furthermore, the network standpoint feature value creating unit 112 may also create feature values by using the same method.

The point standpoint feature value creating unit 114 creates feature values based on the path field "/test/index.php" and the query field "id=1" in a request URL. The path field is an area in which the location (path) of the requested resource is designated. Furthermore, the query field is an area in which a parameter at the time of request is designated.

First, the point standpoint feature value creating unit 114 can use the number of characters in the path field or in the query field as a feature value. In this case, the point standpoint feature value creating unit 114 uses 12 that is the number of characters in the path field or uses 3 that is the number of characters in the query field as the feature value. Here, it is assumed that the point standpoint feature value creating unit 114 does not include delimiters, such as "/" and ".", in the number of characters.

Furthermore, the point standpoint feature value creating unit 114 can use the number of hierarchies in the path field or the number of parameters in the query field as a feature value. In this case, the point standpoint feature value creating unit 114 uses 2 that is the number of hierarchies in the path field or 1 that is the number of parameters in the query field as the feature value.

Furthermore, the point standpoint feature value creating unit 114 may also use, as a feature value, the average number of characters for each hierarchy in the path field or the average number of characters for each parameter in the query field. In this case, the point standpoint feature value creating unit 114 uses 6 that is the average number of characters for each hierarchy in the path field or 3 that is the average number of characters for each parameter in the query field as a feature value.

Furthermore, the point standpoint feature value creating unit 114 can also create a feature value based on the type of the character string included in the path field or the query field. In this case, first, in order to convert information on a request URL represented by a text format to value type information that is generally and easily handled, the point standpoint feature value creating unit 114 converts the path field and the query field to a regular expression. In this case, it is assumed that the regular expression is represented by <the type of a character string (string type, integer type, hex type, and base64 type); the length of a character string>.

Specifically, the point standpoint feature value creating unit 114 converts the path field to "/string;4>/<string;5>.<string;3>" and converts the query field to "<string;2>=<int;1>". Then, the point standpoint feature value creating unit 114 obtains, from the obtained regular expression, the type of the character strings included in each of the path field and the query field, calculates the ratio thereof, and uses them as feature values.

Then, the access detection unit 115 detects, in the second access data, the second access data in which the similarity between the detection target standpoint feature value and the training standpoint feature value is equal to or greater than a predetermined value as access data related to a predetermined continuous access.

Figure 3:
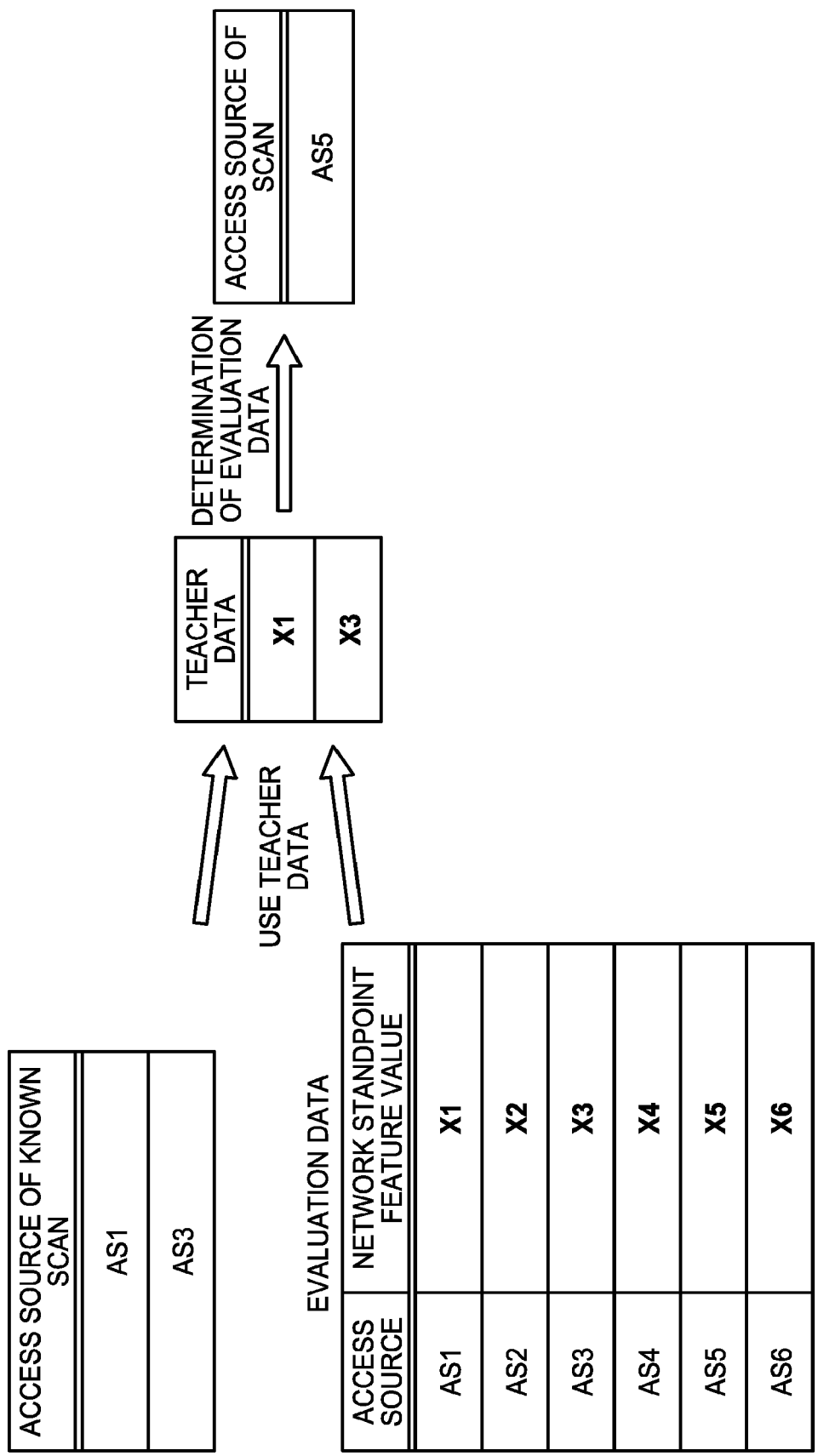
FIG. 3 is a diagram illustrating an analysis process performed by the analysis device according to the first embodiment.
Figure 4:
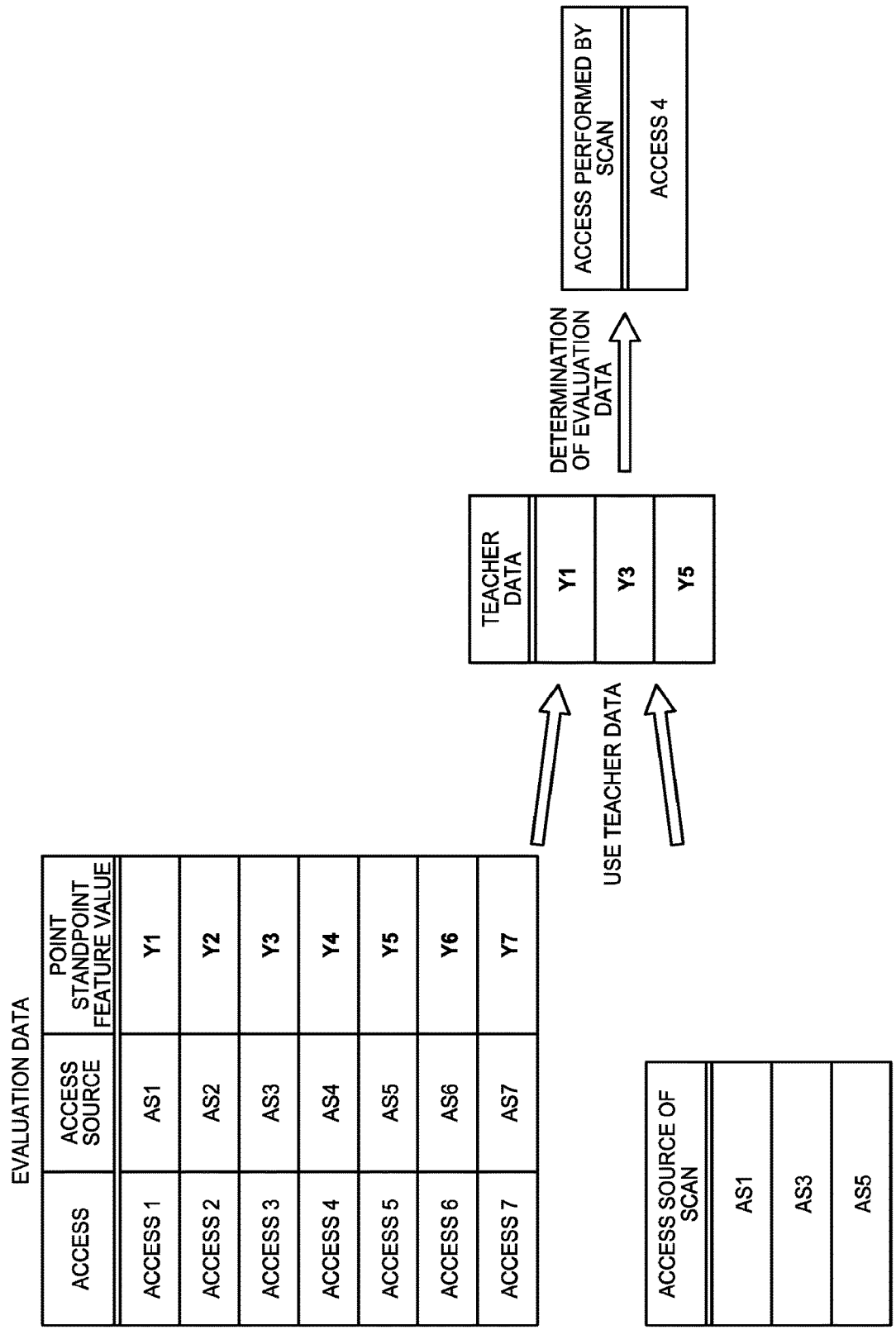
FIG. 4 is a diagram illustrating an analysis process performed by the analysis device according to the first embodiment.

Examples of analysis processes performed by each of the functioning units in the analysis device 10 will be described with reference to FIGS. 3 and 4. FIGS. 3 and 4 are diagrams each illustrating an analysis process performed by the analysis device according to the first embodiment. FIG. 3 and FIG. 4 each illustrates an example in which AS numbers are used as a unit of access sources (hereinafter, referred to as an "access source measurement-unit") and an access performed by a vulnerability scan is detected.

First, as illustrated in FIG. 3, the network standpoint feature value creating unit 112 classifies the access data collected by a plurality of observation points in the network into each AS number of the access source and creates a network standpoint feature value that is a feature value of the access data for each AS number. At this time, the data that is a pair of the access source and the network standpoint feature value is referred to as evaluation data. For example, as indicated by the evaluation data illustrated in FIG. 3, the network standpoint feature value of the access data in which the AS number of the access source is "AS1" is "X1".

Then, the access source detection unit 113 detects, based on the network standpoint feature value, from among the AS numbers, the AS number of the access source of the continuous access performed by a vulnerability scan. At this time, the access source detection unit 113 uses the network standpoint feature values, i.e., "X1" and "X3", associated with the access source of the access performed by a known scan as training data and detects, as the access source of the access performed by the scan from among the pieces of evaluation data, the access source in which the similarity between the network standpoint feature value and the training data is equal to or greater than a predetermined value.

Furthermore, the access source that performs the known scan may also be the access source listed on a public black list. Furthermore, when performing detection of crawling, as known access source of crawling, for example, information stored in a search engine company, such as Google (registered trademark), may be used.

Furthermore, the feature of crawling is different in accordance with search engine companies and it is known that, in particular, the feature of the crawling performed by Google is significantly different from that performed by other search engines. Consequently, first, by using crawling performed by Google as known crawling, erroneous detection can be reduced.

In the example illustrated in FIG. 3, because the similarity between a network standpoint feature value "X5" and the training data is equal to or greater than a predetermined value, "AS5" that is the access source of the network standpoint feature value "X5" is detected as the access source of a scan. Furthermore, in this case, the evaluation data in which the access source is the access source of a known scan, i.e., the evaluation data in which "AS1" and "AS3" are used as the access sources, is previously excluded from the evaluation data for the detection target. Then, the access source detection unit 113 allows the access source storage unit 121 to store the detected "AS5".

Then, as illustrated in FIG. 4, the point standpoint feature value creating unit 114 creates a detection target standpoint feature value that is a feature value for each access data for the detection target collected at a single observation point in the network. At this time, the data of a pair of each of the access sources of accesses and the detection target standpoint feature values is referred to as evaluation data. For example, as indicated by the evaluation data illustrated in FIG. 4, the AS number of the access source of an access 1 is "AS1" and the detection target standpoint feature value is "Y1".

Furthermore, the point standpoint feature value creating unit 114 creates a training standpoint feature value that is a feature value for each access data in which the access source is the AS number stored in the access source storage unit 121 and uses the created training standpoint feature value as training data.

Then, the access detection unit 115 detects, from among the pieces of evaluation data, the access data in which the similarity between the detection target standpoint feature value and the training data is equal to or greater than the predetermined value as the access data related to the continuous access performed by a scan. In the example illustrated in FIG. 4, because the similarity between a detection target standpoint feature value "Y4" and the training data is equal to or greater than the predetermined value, an access 4 is detected as the access performed by a scan. Furthermore, in this case, the evaluation data indicating that the access source is the access source related to an access performed by a known scan, i.e., an "access 1", an "access 3", and an "access 5", is previously excluded from the evaluation data. Then, the access detection unit 115 allows the access storage unit 122 to store the detected "access 4". Furthermore, the access source detection unit 113 and the access detection unit 115 calculate the similarity by using the same procedure as that used in, for example, Non-Patent Document 4.

Process in the First Embodiment

The process performed by the analysis device 10 will be described. A case of detecting a scan has been described by using the examples illustrated in FIG. 3 and FIG. 4; however, the analysis device 10 may also detect crawling. Consequently, the analysis device 10 can perform detection processes: (1) a scan detection process using network standpoint feature values, (2) a crawling detection process using network standpoint feature values, (3) a scan detection process using point standpoint feature values, and (4) a crawling detection process using point standpoint feature values. Thus, each of the processes (1) to (4) will be described first and, then, combinations of the processes (1) to (4) will be described.

((1) Scan Detection Process Performed by Using the Network Standpoint Feature Values)

Figure 5:
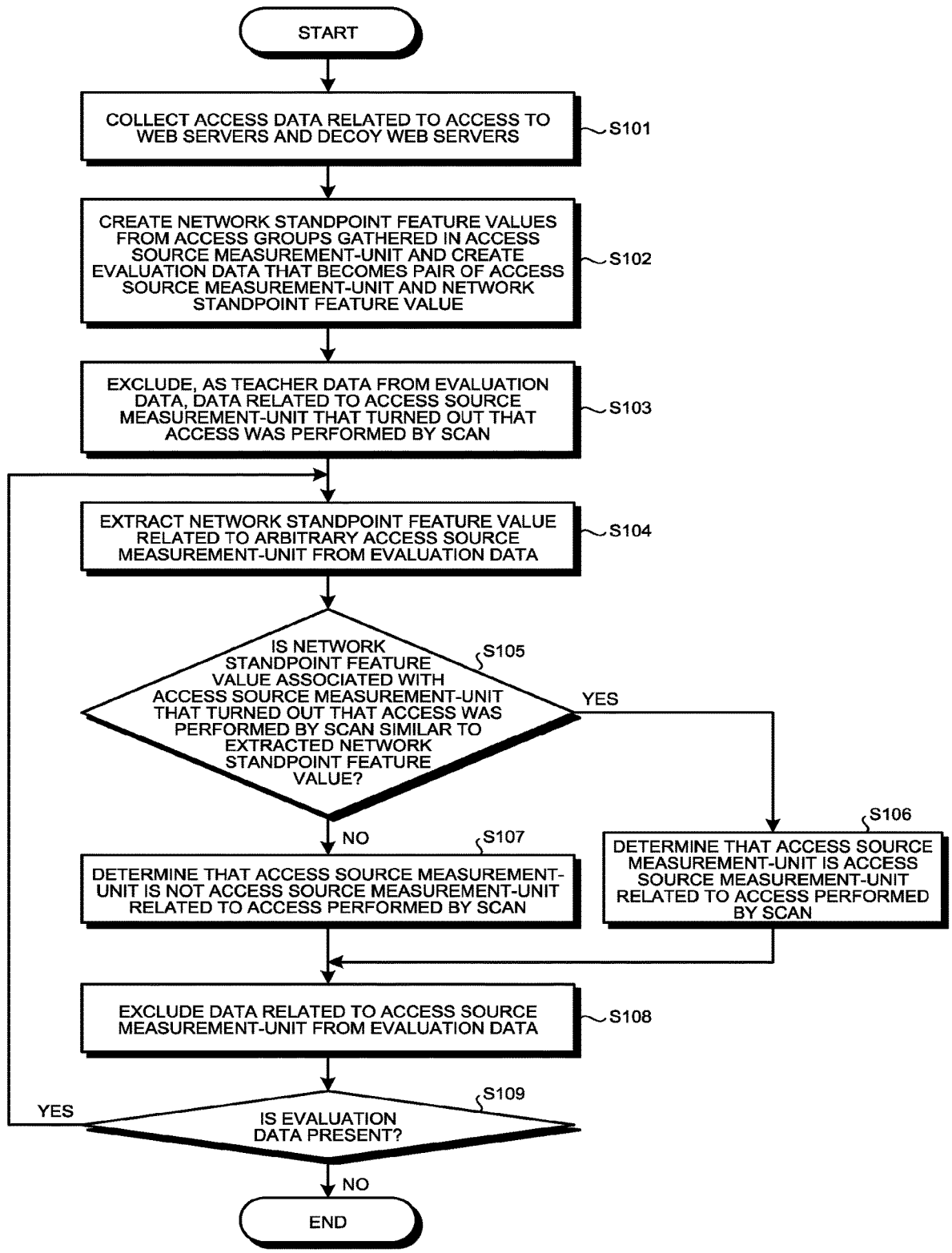
FIG. 5 is a flowchart illustrating the flow of a scan detection process performed by using network standpoint feature values by the analysis device according to the first embodiment.

First, a scan detection process performed by using the network standpoint feature values will be described with reference to FIG. 5. FIG. 5 is a flowchart illustrating the flow of the scan detection process performed by using network standpoint feature values by the analysis device according to the first embodiment. As illustrated in FIG. 5, first, the collecting unit 111 collects access data related to an access to the Web servers and the decoy Web servers (Step S101). Then, the network standpoint feature value creating unit 112 creates network standpoint feature values from access groups that are gathered in an access source measurement-unit and creates evaluation data that becomes a pair of an access source measurement-unit and a network standpoint feature value (Step S102). At this time, the network standpoint feature value creating unit 112 excludes, as the training data from the evaluation data, the data related to the access source measurement-unit that turned out that an access was performed by a scan (Step S103).

The access source detection unit 113 extracts the network standpoint feature value related to an arbitrary access source measurement-unit from the evaluation data (Step S104) and determines whether the network standpoint feature value associated with the access source measurement-unit that turned out that an access was performed by a scan is similar to the extracted network standpoint feature value (Step S105).

At this time, if the network standpoint feature value associated with the access source measurement-unit that turned out that an access was performed by a scan is similar to the extracted network standpoint feature value (Yes at Step S105), the access source detection unit 113 determines that the access source measurement-unit is the access source measurement-unit related to an access performed by a scan (Step S106). In contrast, if the network standpoint feature value associated with the access source measurement-unit that that turned out that an access was performed by a scan is not similar to the extracted network standpoint feature value (No at Step S105), the access source detection unit 113 determines that the access source measurement-unit is not the access source measurement-unit related to an access performed by a scan (Step S107).

The access source detection unit 113 excludes, after the determination, the data related to the access source measurement-unit from the evaluation data (Step S108). Then, if undetermined evaluation data is present (Yes at Step S109), the analysis device 10 returns to Step S104 and repeats the process. Furthermore, if undetermined evaluation data is not present (No at Step S109), the analysis device 10 ends the process.

Namely, the access source detection unit 113 detects, from among the detection target access sources, an access source in which the similarity between the network standpoint feature value and the training network standpoint feature value that is created from the access data related to an access performed by a known access source that performs the access by a vulnerability scan is equal to or greater than the predetermined value as the access source that performs the continuous access by the vulnerability scan.

((2) Crawling Detection Process Performed by Using the Network Standpoint Feature Values)

Figure 6:
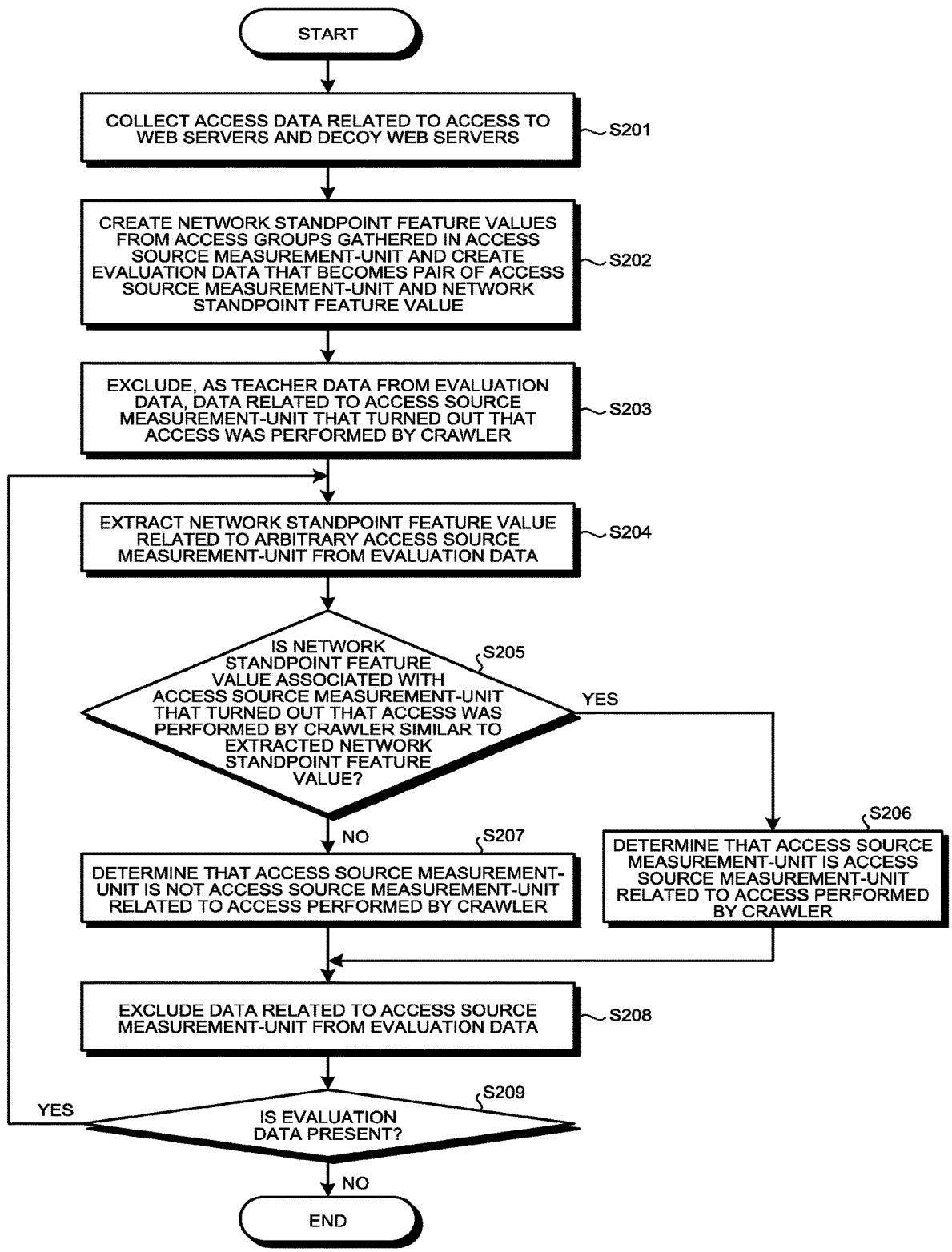
FIG. 6 is a flowchart illustrating the flow of a crawling detection process performed by using the network standpoint feature values by the analysis device according to the first embodiment.

In the following, a crawling detection process performed by using the network standpoint feature values will be described with reference to FIG. 6. FIG. 6 is a flowchart illustrating the flow of the crawling detection process performed by using the network standpoint feature values by the analysis device according to the first embodiment. As illustrated in FIG. 6, first, the collecting unit 111 collects access data related to an access to the Web servers and the decoy Web servers (Step S201). Then, the network standpoint feature value creating unit 112 creates network standpoint feature values from groups that are gathered in an access source measurement-unit and creates evaluation data that becomes a pair of an access source measurement-unit and a network standpoint feature value (Step S202). At this time, the network standpoint feature value creating unit 112 excludes, as the training data from the evaluation data, the data related to the access source measurement-unit that turned out that an access was performed by a crawler (Step S203).

The access source detection unit 113 extracts the network standpoint feature value related to an arbitrary access source measurement-unit from the evaluation data (Step S204) and determines whether the network standpoint feature value associated with the access source measurement-unit that turned out that an access was performed by crawling is similar to the extracted network standpoint feature value (Step S205).

At this time, if the network standpoint feature value associated with the access source measurement-unit that turned out that an access was performed by crawling is similar to the extracted network standpoint feature value (Yes at Step S205), the access source detection unit 113 determines that the access source measurement-unit is the access source measurement-unit related to an access performed by a crawler (Step S206). In contrast, if the network standpoint feature value associated with the access source measurement-unit that turned out that an access was performed by crawling is not similar to the extracted network standpoint feature value (No at Step S205), the access source detection unit 113 determines that the access source measurement-unit is not the access source measurement-unit related to an access performed by a crawler (Step S207).

The access source detection unit 113 excludes, after the determination, the data related to the access source measurement-unit from the evaluation data (Step S208). Then, if undetermined evaluation data is present (Yes at Step S209), the analysis device 10 returns to Step S204 and repeats the process. Furthermore, if undetermined evaluation data is not present (No at Step S209), the analysis device 10 ends the process.

Namely, the access source detection unit 113 detects, from among the detection target access sources, an access source in which the similarity between the network standpoint feature value and the training network standpoint feature value that is created from the access data related to an access performed by a known access source that performs the access by a crawler is equal to or greater than the predetermined value as the access source that performs the continuous access by the crawler.

((3) Scan Detection Process Performed by Using the Point Standpoint Feature Values)

Figure 7:
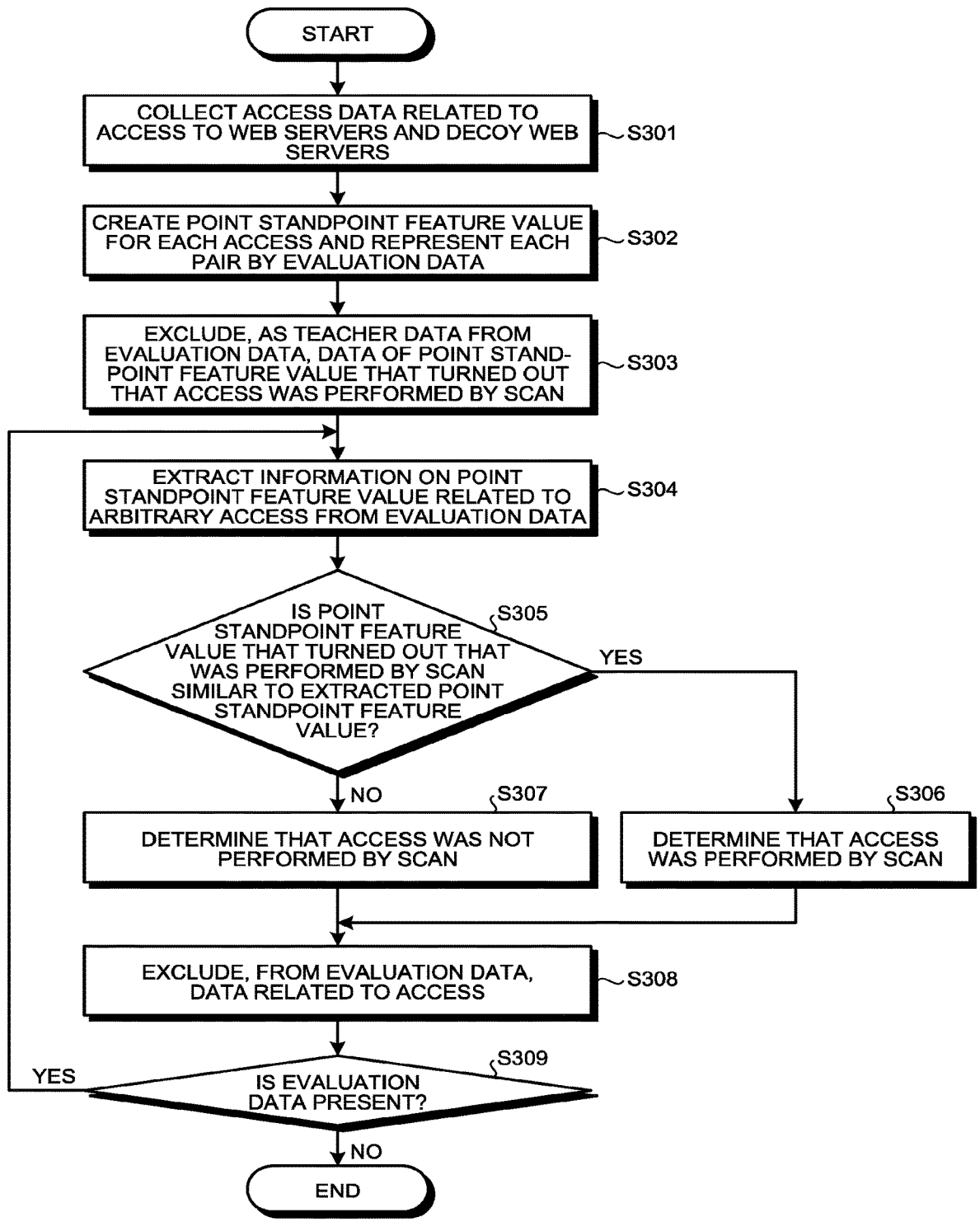
FIG. 7 is a flowchart illustrating the flow of a scan detection process performed by using point standpoint feature values by the analysis device according to the first embodiment.

In the following, a scan detection process performed by using the point standpoint feature values will be described with reference to FIG. 7. FIG. 7 is a flowchart illustrating the flow of the scan detection process performed by using point standpoint feature values by the analysis device according to the first embodiment. As illustrated in FIG. 7, first, the collecting unit 111 collects access data related to an access to the Web servers and the decoy Web servers (Step S301). Then, the point standpoint feature value creating unit 114 creates a point standpoint feature value for each access and represents each pair by evaluation data (Step S302). At this time, the point standpoint feature value creating unit 114 excludes, as the training data from the evaluation data, the data of the point standpoint feature value related to an access that turned out that the access was performed by a scan (Step S303).

The access detection unit 115 extracts the information on the point standpoint feature value related to an arbitrary access from the evaluation data (Step S304) and determines whether the point standpoint feature value related to an access that turned out that the access was performed by a scan is similar to the extracted point standpoint feature value (Step S305).

At this time, if the point standpoint feature value related to an access that turned out that the access was performed by a scan is similar to the extracted point standpoint feature value (Yes at Step S305), the access detection unit 115 determines that the access is the access performed by a scan (Step S306). In contrast, if the point standpoint feature value related to an access that turned out that the access was performed by a scan is not similar to the extracted point standpoint feature value (No at Step S305), the access detection unit 115 determines that the access is not the access performed by a scan (Step S307).

The access detection unit 115 excludes, after the determination, the data related to the access from the evaluation data (Step S308). Then, if undetermined evaluation data is present (Yes at Step S309), the analysis device 10 returns to Step S304 and repeats the process. Furthermore, if undetermined evaluation data is not present (No at Step S309), the analysis device 10 ends the process.

((4) Crawling Detection Process Performed by Using the Point Standpoint Feature Values)

Figure 8:
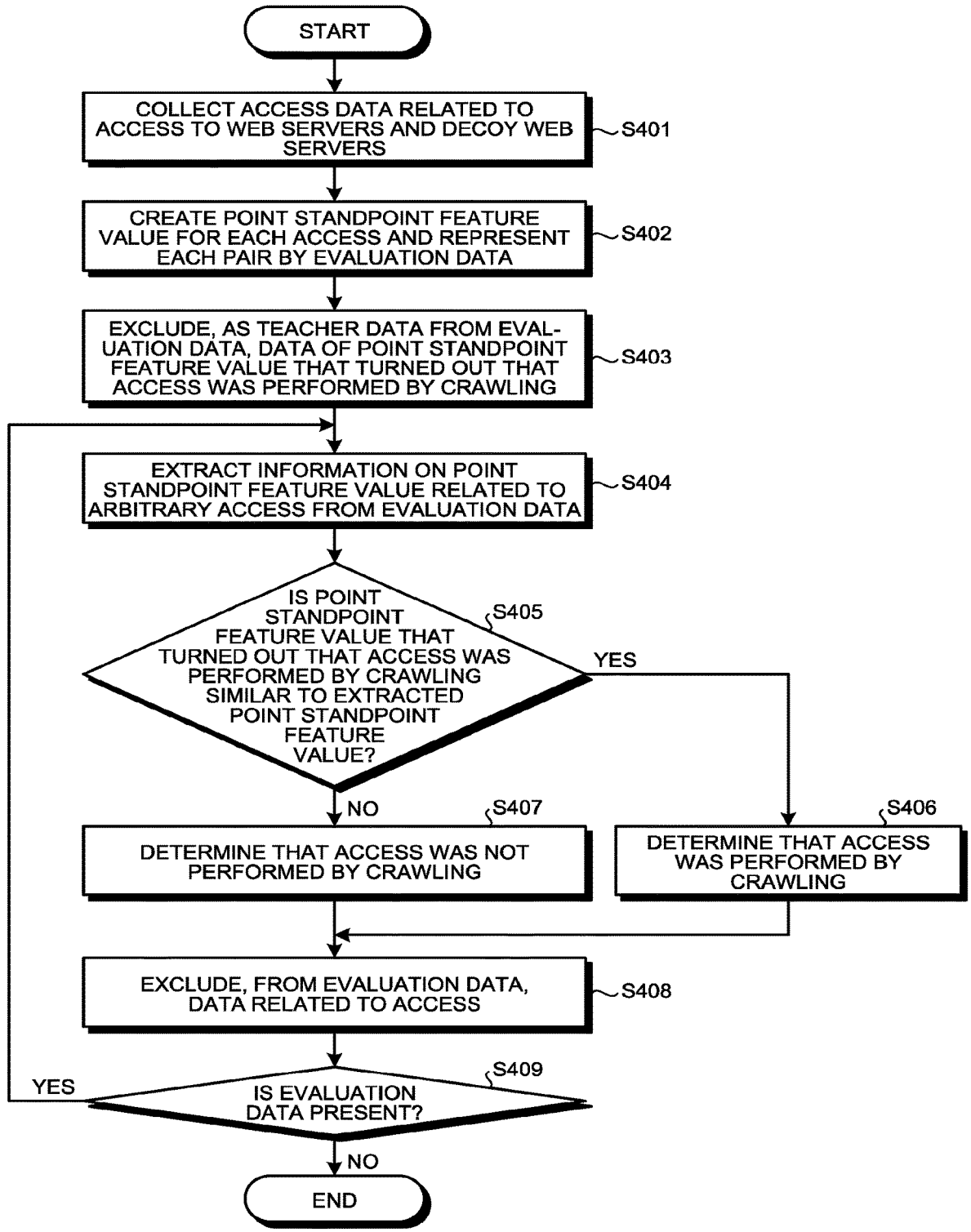
FIG. 8 is a flowchart illustrating the flow of a crawling detection process by using the point standpoint feature values by the analysis device according to the first embodiment.

In the following, a crawling detection process performed by using the point standpoint feature values will be described with reference to FIG. 8. FIG. 8 is a flowchart illustrating the flow of the crawling detection process by using the point standpoint feature values by the analysis device according to the first embodiment. As illustrated in FIG. 8, first, the collecting unit 111 collects access data related to an access to the Web servers and the decoy Web servers (Step S401). Then, the point standpoint feature value creating unit 114 creates a point standpoint feature value for each access and represents each pair by evaluation data (Step S402). At this time, the point standpoint feature value creating unit 114 excludes, as the training data from the evaluation data, the data of the point standpoint feature value related to an access that turned out that the access was performed by crawling (Step S403).

The access detection unit 115 extracts the information on the point standpoint feature value related to an arbitrary access from the evaluation data (Step S404) and determines whether the point standpoint feature value related to an access that turned out that the access was performed by crawling is similar to the extracted point standpoint feature value (Step S405).

At this time, if the point standpoint feature value related to an access that turned out that the access was performed by crawling is similar to the extracted point standpoint feature value (Yes at Step S405), the access detection unit 115 determines that the access was the access performed by crawling (Step S406). In contrast, if the point standpoint feature value related to an access that turned out that the access was performed by crawling is not similar to the extracted point standpoint feature value (No at Step S405), the access detection unit 115 determines that the access is not the access performed by crawling (Step S407).

The access detection unit 115 excludes, after the determination, the data related to the access from the evaluation data (Step S408). Then, if undetermined evaluation data is present (Yes at Step S409), the analysis device 10 returns to Step S404 and repeats the process. Furthermore, if undetermined evaluation data is not present (No at Step S409), the analysis device 10 ends the process.

Furthermore, by combining the processes (1) to (4), it is possible to detect a scan and crawling with high accuracy. In particular, by previously performing detection using the network standpoint feature values, it is possible to acquire information on the access source performed by a known scan or crawling and use the acquired information to perform detection by using the point standpoint feature values. Consequently, it is possible to improve the accuracy of detection performed by only using the point standpoint feature values.

(Combination of (1) and (3))

Figure 9:
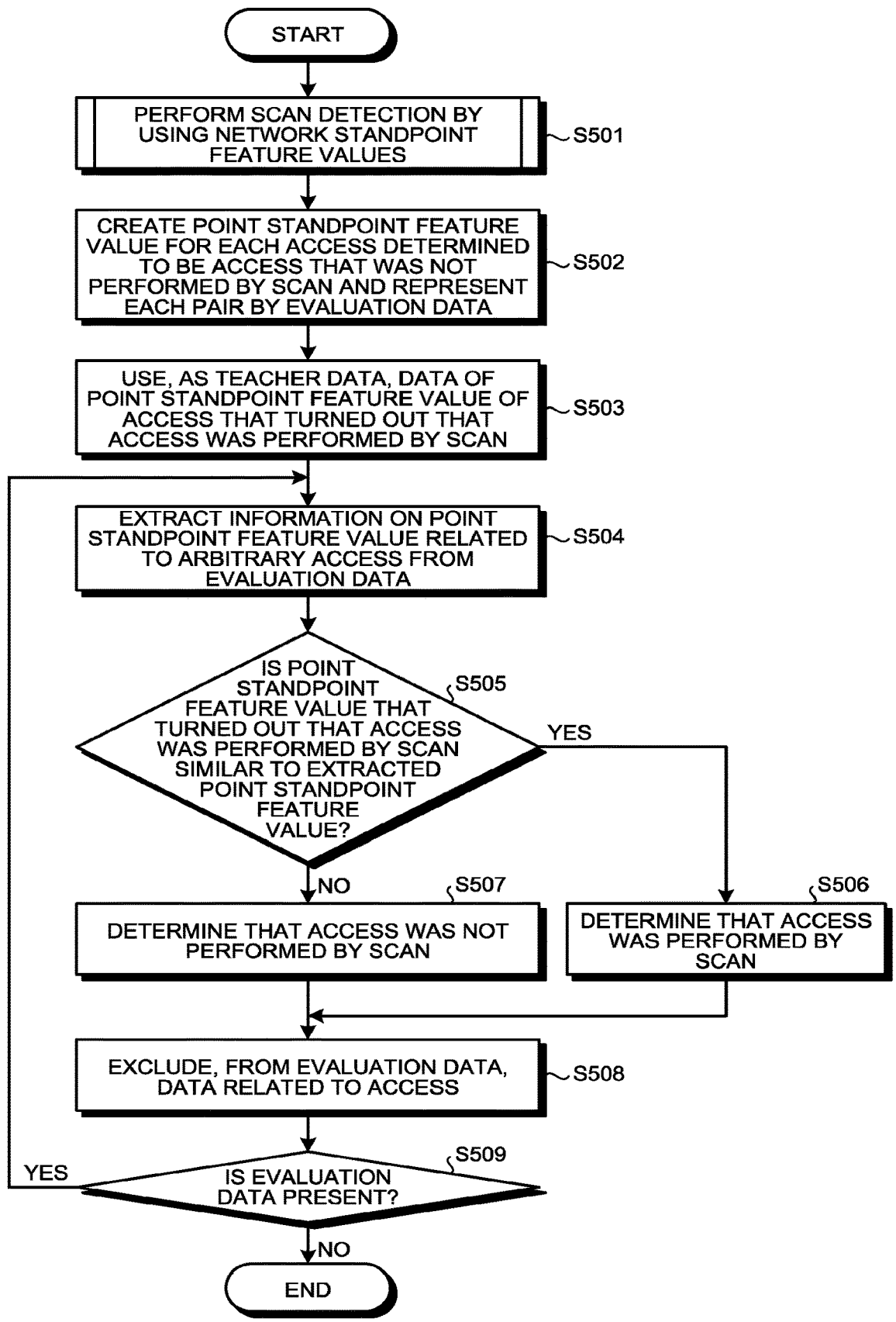
FIG. 9 is a flowchart illustrating the flow of a scan detection process performed by using the network standpoint feature values and the point standpoint feature values by the analysis device according to the first embodiment.

First, a scan detection process performed by using the network standpoint feature values and the point standpoint feature values will be described with reference to FIG. 9. FIG. 9 is a flowchart illustrating the flow of the scan detection process performed by using the network standpoint feature values and the point standpoint feature values by the analysis device according to the first embodiment. As illustrated in FIG. 9, first, the analysis device 10 performs, in the process illustrated in FIG. 5, scan detection by using the network standpoint feature values (Step S501).

Then, the point standpoint feature value creating unit 114 creates, for each access determined to be the access that was not performed by a scan at Step S501, a point standpoint feature value and represents each pair by evaluation data (Step S502). Specifically, the point standpoint feature value creating unit 114 can create the point standpoint feature values of the evaluation data based on the access data of the access source determined not to be the access source of an access performed by a scan at Step S501.

At this time, the point standpoint feature value creating unit 114 uses the data of the point standpoint feature value of the access that turned out that the access was performed by a scan as the training data (Step S503). Specifically, the point standpoint feature value creating unit 114 can use, as the training data, the point standpoint feature values created based on the access data of the access source determined to be the access source of an access performed by the scan at Step S501. The processes performed at Steps S504 to 509 are the same as those performed at Steps S304 to 309 illustrated in FIG. 7; therefore, descriptions thereof will be omitted.

(Combination of (2) and (4))

Figure 10:
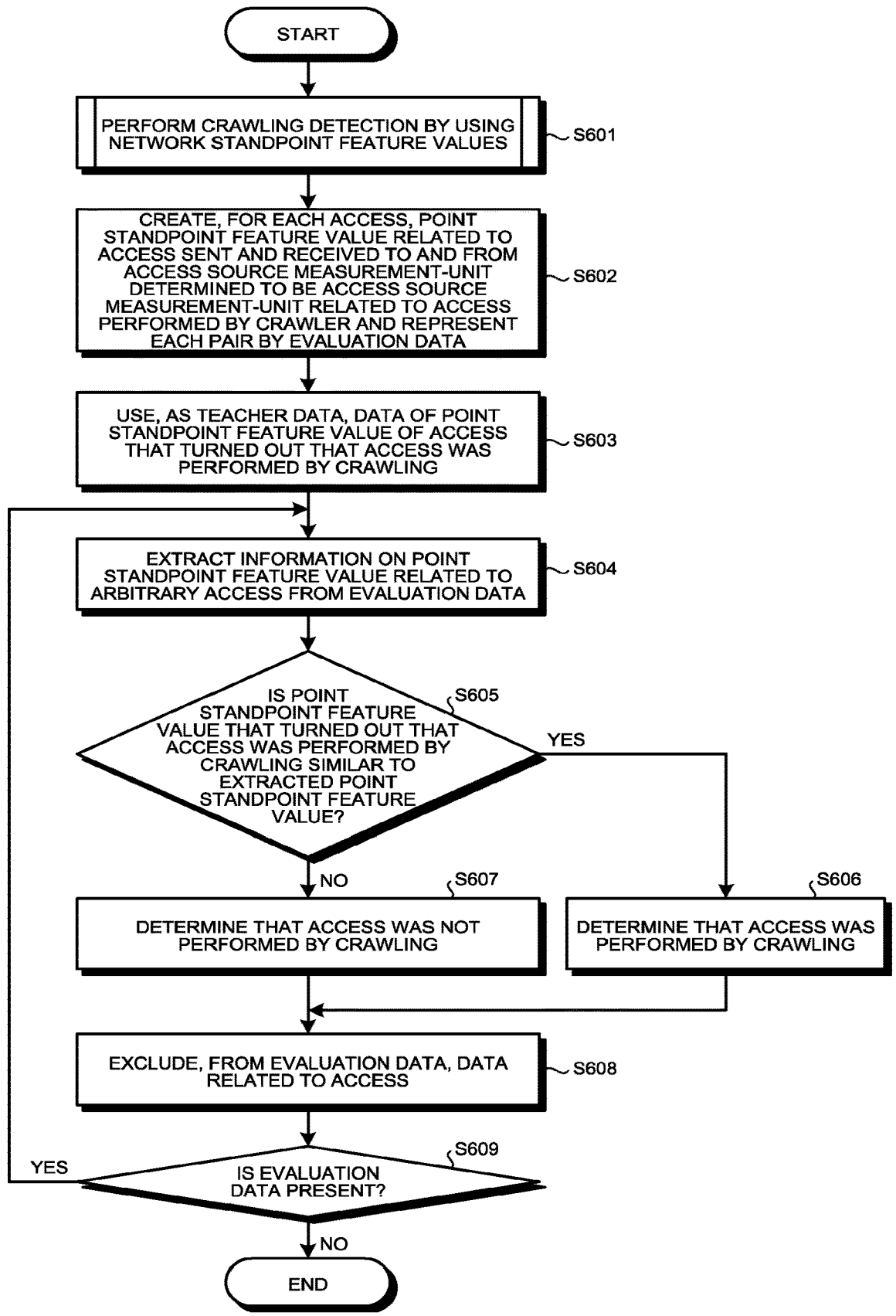
FIG. 10 is a flowchart illustrating the flow of a crawling detection process performed by using the network standpoint feature values and the point standpoint feature values by the analysis device according to the first embodiment.

In the following, a crawling detection process performed by using the network standpoint feature values and the point standpoint feature values will be described with reference to FIG. 10. FIG. 10 is a flowchart illustrating the flow of the crawling detection process performed by using the network standpoint feature values and the point standpoint feature values by the analysis device according to the first embodiment. As illustrated in FIG. 10, first, the analysis device 10 performs, in the process illustrated in FIG. 6, crawling detection by using the network standpoint feature values (Step S601).

Then, the point standpoint feature value creating unit 114 creates, for each access determined to be the access that was not performed by crawling at Step S601, a point standpoint feature value and represents each pair by evaluation data (Step S602). Specifically, the point standpoint feature value creating unit 114 can create the point standpoint feature values of the evaluation data based on the access data of the access source determined not to be the access source of the access performed by crawling at Step S601.

At this time, the point standpoint feature value creating unit 114 uses the data of the point standpoint feature value of the access that turned out that the access was performed by crawling as the training data (Step S603). Specifically, the point standpoint feature value creating unit 114 can use, as the training data, the point standpoint feature values created based on the access data of the access source determined to be the access source of the access performed by crawling at Step S601. The processes performed at Steps S604 to S609 are the same as those performed at Steps S404 to S409 illustrated in FIG. 8; therefore, descriptions thereof will be omitted.

(Combination of (2) and (1))

Figure 11:
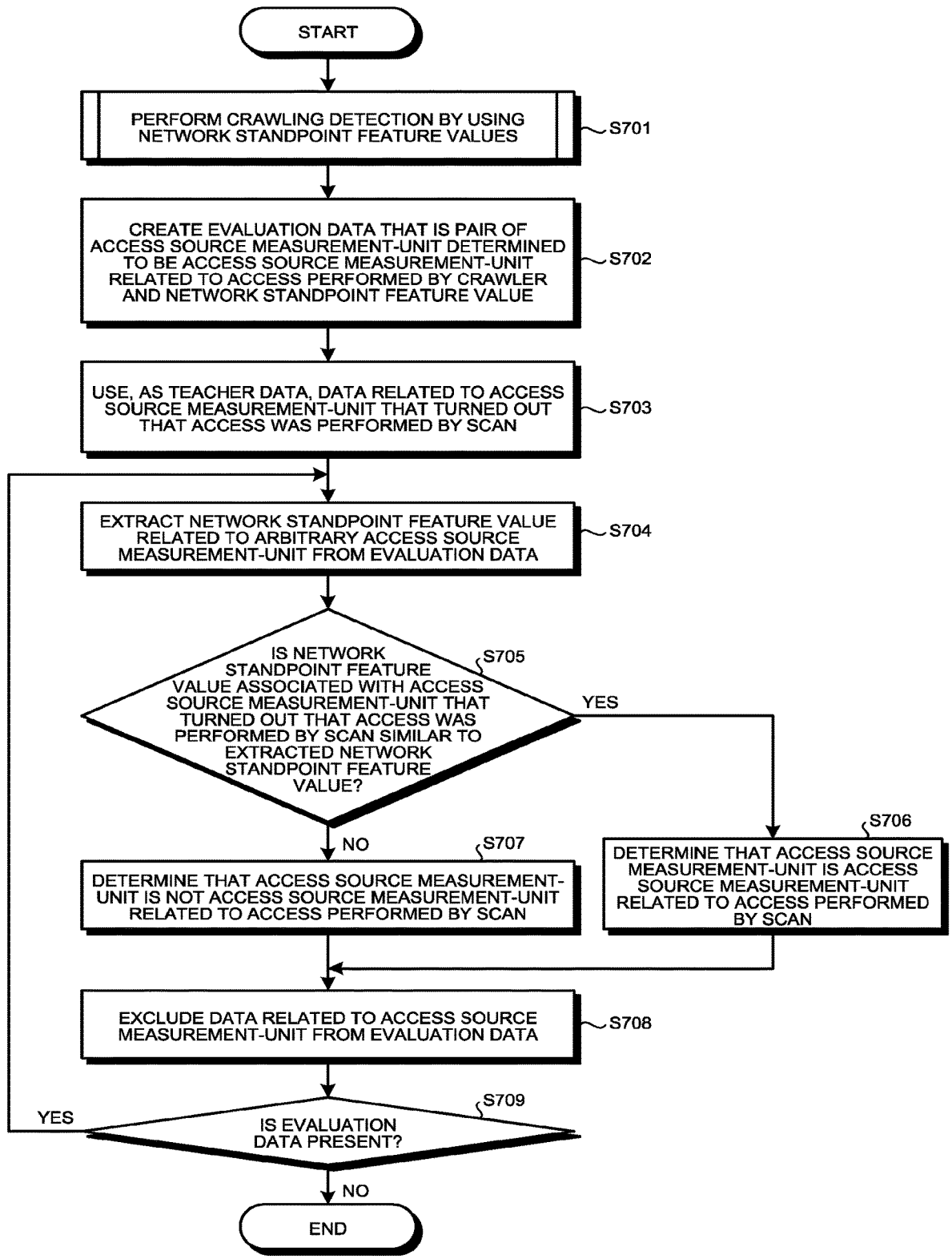
FIG. 11 is a flowchart illustrating the flow of a detection process performed by only using the network standpoint feature values by the analysis device according to the first embodiment.

In the following, a detection process performed by only using the network standpoint feature values will be described with reference to FIG. 11. FIG. 11 is a flowchart illustrating the flow of a detection process performed by only using the network standpoint feature values by the analysis device according to the first embodiment. As illustrated in FIG. 11, first, the analysis device 10 performs, in the process illustrated in FIG. 6, crawling detection by using the network standpoint feature values (Step S701). Then, the network standpoint feature value creating unit 112 creates evaluation data that is a pair of an access source measurement-unit determined to be the access source measurement-unit that was not the access source measurement-unit related to an access performed by crawler and the network standpoint feature value (Step S702). At this time, the network standpoint feature value creating unit 112 uses, as the training data, the data related to the access source measurement-unit that turned out that an access was performed by a scan (Step S703). The processes performed at Steps S704 to S709 are the same as those performed at Steps S104 to S109 illustrated in FIG. 5; therefore, descriptions thereof will be omitted.

In the process illustrated in FIG. 11, the access source detection unit 113 further detects, from among the detection target access sources, from the access sources other than the access source that has been detected by the access source detection unit 113 as the access source that performs the continuous access by a crawler, the access source that performs the continuous access by a vulnerability scan.

In this way, by performing determination, by targeting for an access source determined to be the access source related to the access that was not performed by a crawler, whether the access source is related to an access performed by a scan, it is possible to more accurately distinguish crawling from a scan.

(Combination of (4) and (3))

Figure 12:
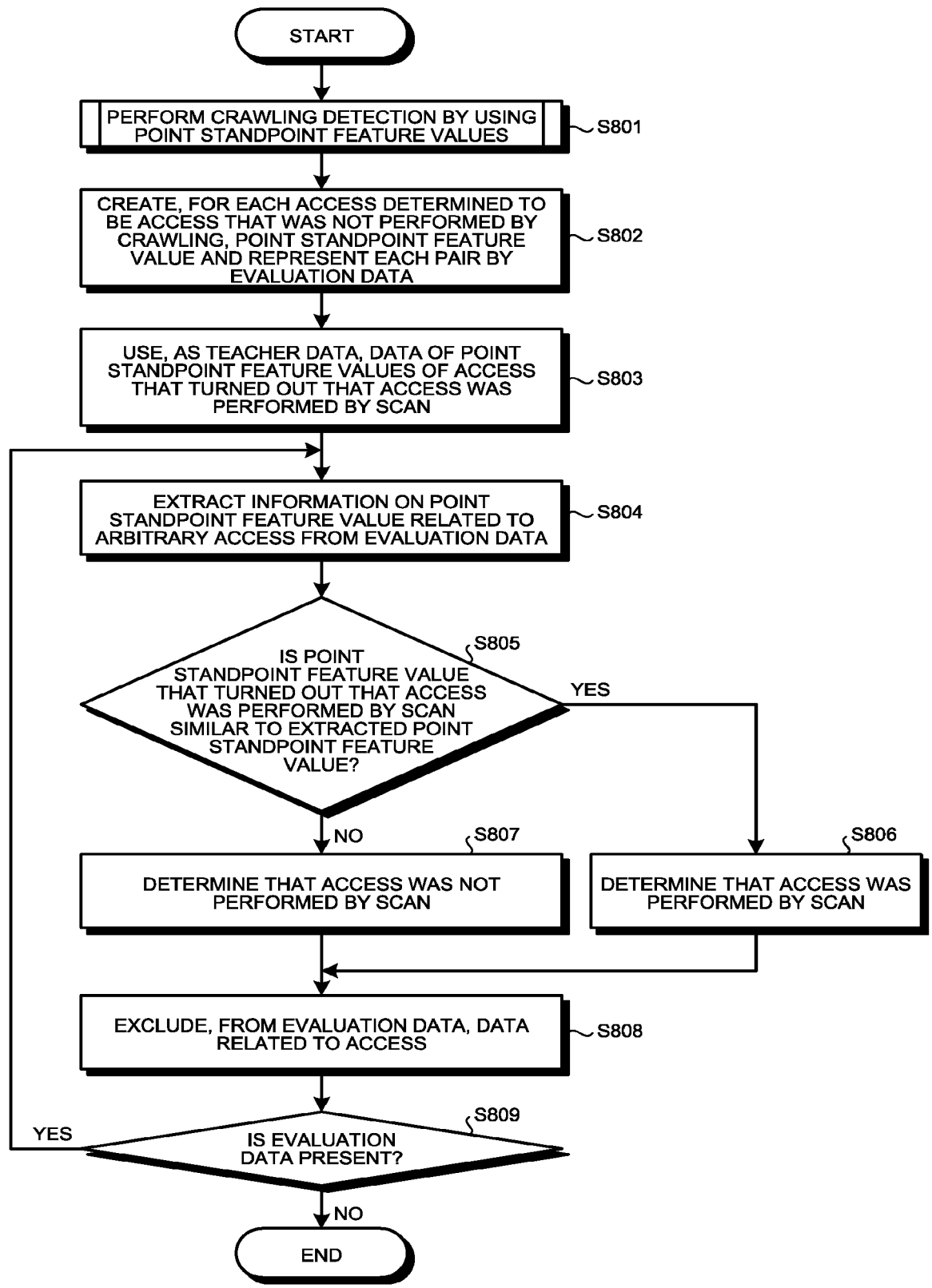
FIG. 12 is a flowchart illustrating the flow of a detection process performed by only using the point standpoint feature values by the analysis device according to the first embodiment.

In the following, a detection process performed by only using the point standpoint feature values will be described with reference to FIG. 12. FIG. 12 is a flowchart illustrating the flow of a detection process performed by only using the point standpoint feature values by the analysis device according to the first embodiment. As illustrated in FIG. 12, first, the analysis device 10 performs, in the process illustrated in FIG. 8, crawling detection by using the point standpoint feature values (Step S801). Then, the point standpoint feature value creating unit 114 creates, for each access determined to be the access that is not performed by crawling, a point standpoint feature value and represents each pair by evaluation data (Step S802). At this time, the point standpoint feature value creating unit 114 uses, as the training data, the data of the point standpoint feature values related to an access that turned out that the access was performed by a scan (Step S803). The processes performed at Steps S804 to S809 are the same as those performed at Steps S304 to S309 illustrated in FIG. 7; therefore, descriptions thereof will be omitted.

Effects in the First Embodiment

The network standpoint feature value creating unit 112 classifies the first access data that is collected at a plurality of observation points in a network and that is related to an access to a server in the network into each detection target access source that is an access source of the access and creates a network standpoint feature values that are feature values of the first access data for each of the detection target access sources. Furthermore, the access source detection unit 113 detects, based on the network standpoint feature values, from among the detection target access sources, the access source that performs a predetermined continuous access. Furthermore, the point standpoint feature value creating unit 114 creates detection target standpoint feature values that are feature values for each piece of the second access data that is collected at a single observation point in the network and that is related to an access to a server in the network and creates training standpoint feature values that are feature values for each piece of the first access data in which, from among the pieces of the first access data, the access source is detected by the access source detection unit 113. Furthermore, the access detection unit 115 detects, from among the pieces of the second access data, the second access data in which the similarity between the detection target standpoint feature value and the training standpoint feature value is equal to or greater than a predetermined value as access data related to an access performed by the predetermined continuous access.

In this way, by previously performing detection using the network standpoint feature values from which crawling or a scan can be identified, it is possible to perform detection with high accuracy even if the detection is performed by using the point standpoint feature values. Namely, according to the embodiment, it is possible to detect, from limited information, communication performed by an attack while distinguishing the communication from normal communication similar to the communication performed by the attack.

Figure 13:
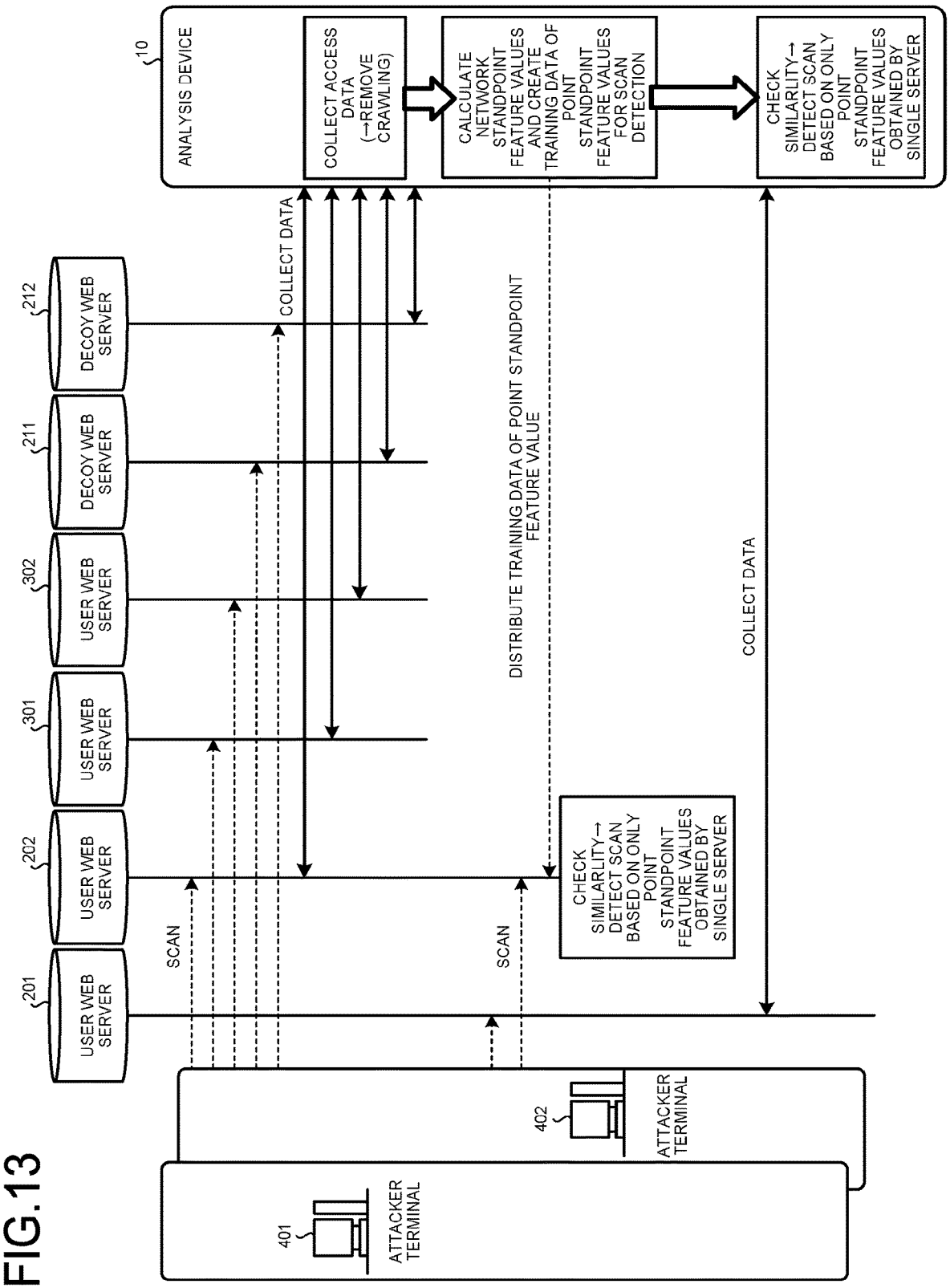
FIG. 13 is a diagram illustrating the effect of the analysis device according to the first embodiment.

The effects of the embodiment will be further described in detail with reference to FIG. 13. FIG. 13 is a diagram illustrating the effect of the analysis device according to the first embodiment. As illustrated in FIG. 13, first, a scan performed by the attacker terminal 401 or the like is usually found by performing observation by using a plurality of Web servers and decoy Web servers and by analyzing from the statistical point of view.

Thus, in the embodiment, the analysis results from the statistical viewpoint are used as the network standpoint feature values. Then, regarding the access that is determined, based on the network standpoint feature values, to be the access that is performed by a scan, when analyzing the point standpoint feature values, it is possible to create the training data of the point standpoint feature values observed in a scan. By using the training data, it is possible to detect a scan based on the similarity between the point standpoint feature values even when a scan is not able to be observed only in a single Web server.

The network standpoint feature value creating unit 112 uses one of a transmission source address, an address block, and an address management company of a packet as the detection target access source and includes, in the network standpoint feature value, at least one of statistical information on the packet sizes, statistical information on the packet arrival intervals, statistical information on the number of packets, statistical information on port numbers, continuity of the port numbers, and continuity of the destination addresses. Furthermore, the point standpoint feature value creating unit 114 includes, in each of the detection target standpoint feature values and each of the training standpoint feature values, at least one of a set of a request field, a header field, and a body field in an HTTP request message; a set of a request field, a header field, and a body field in an HTTP response message; address information on a packet; and port number information of the packet. In this way, by including information from which an access performed by an attack can be particularly and easily detected in a feature value, it is possible to perform further accurate detection.

The access source detection unit 113 detects an access source that performs the continuous access by a vulnerability scan or an access source that performs the continuous access by a crawler. Consequently, it is possible to distinguish a scan from crawling similar in terms of burst access in a short period of time.

The access source detection unit 113 detects, from among the detection target access sources, an access source in which the similarity between the network standpoint feature value and a training network standpoint feature value that is created from the access data related to an access performed by a known access source that performs the access by the vulnerability scan is equal to or greater than the predetermined value as the access source that performs the continuous access by the vulnerability scan. Furthermore, the access source detection unit 113 detects, from among the detection target access sources, an access source in which the similarity between the network standpoint feature value and the training network standpoint feature value that is created from the access data related to an access performed by a known access source that performs the access by a crawler is equal to or greater than the predetermined value as the access source that performs the continuous access by the crawler. In this way, by performing determination based on the similarity with a feature value of known access data, it is possible to detect unknown access data.

The access source detection unit 113 further detects, from among access sources that are included in the detection target access sources and that are other than the access source was detected by the access source detection unit 113 as the access source that performs the continuous access by a crawler, an access source that performs the continuous access by a vulnerability scan. In this way, by previously excluding the access performed by crawling and by detecting an access performed by a scan, it is possible to further improve the accuracy.

[System Configuration, Etc.]

The components of the devices illustrated in the drawings are only for conceptually illustrating the functions thereof and are not always physically configured as illustrated in the drawings. In other words, the specific shape of a separation or integrated device is not limited to the drawings. Specifically, all or part of the device can be configured by functionally or physically separating or integrating any of the units depending on various loads or use conditions. Furthermore, all or any part of each of the processing functions performed by the processing units can be implemented by a central processing unit (CPU) and by programs analyzed and executed by the CPU or implemented as hardware by wired logic.

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

[Program]

As an embodiment, the analysis device can be mounted by installing, in a desired computer, an analysis program that executes the analysis process described above as packaged software or online software. For example, by causing an information processing apparatus to execute the analysis program described above, it is possible to allow the information processing apparatus to function as the analysis device. An example of the information processing apparatus mentioned here includes a desktop or a notebook personal computer. Furthermore, other than this, an example of the information processing apparatus includes a mobile communication terminal, such as smartphone, a mobile phone, or Personal Handyphone System (PHS), and a slate terminal, such as a Personal Digital Assistant (PDA).

Furthermore, the analysis device can also be mounted as a server device, together with a terminal device used by a user as a client, that provides a service related to the analysis process described above to the client. For example, the analysis device is mounted as a server device that provides the analysis service for inputting access logs and outputting profiles for each user. In this case, the analysis device may also be mounted as a Webserver or mounted as a cloud so as to provide a service related to analysis described above by outsourcing.

Figure 14:
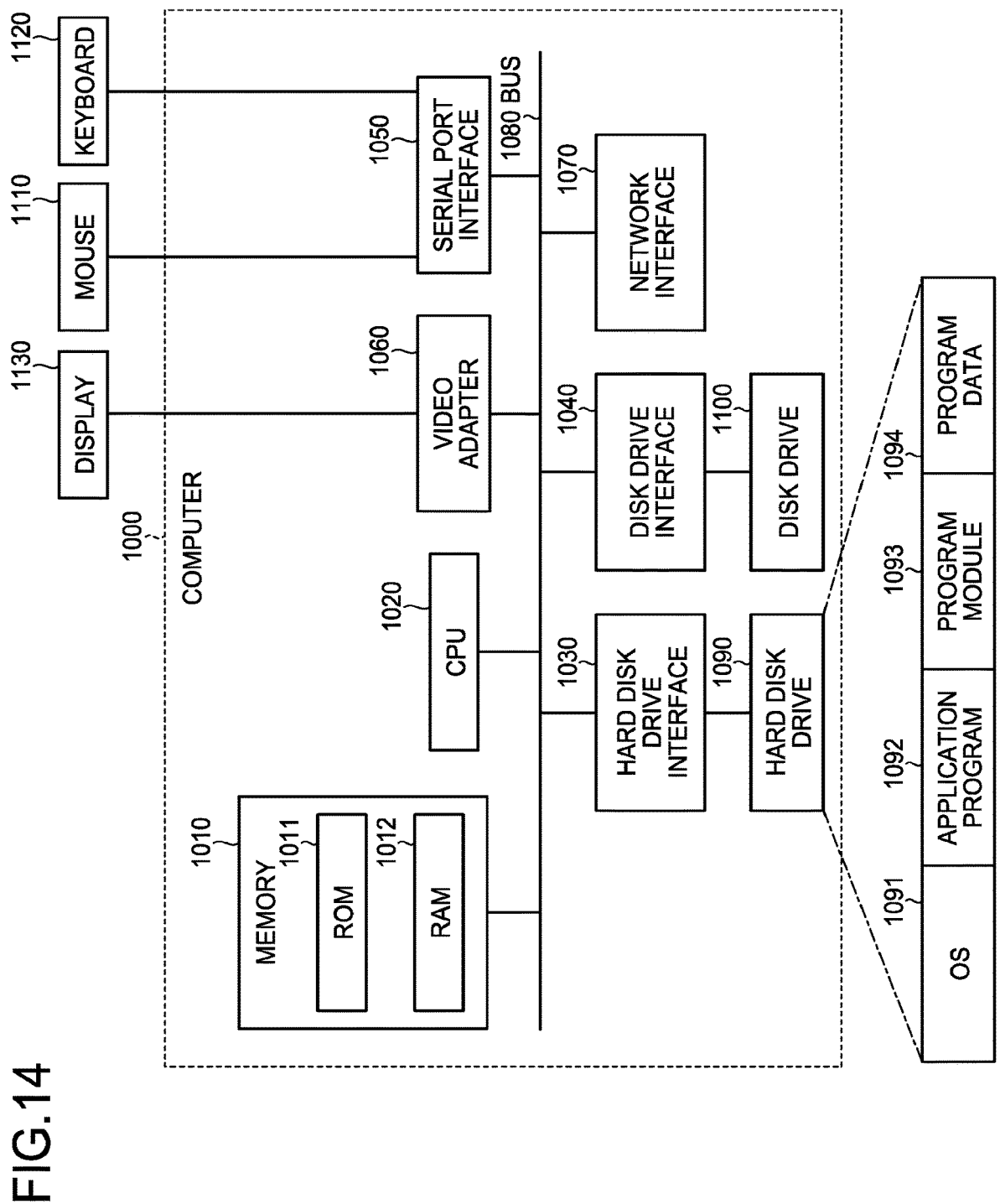
FIG. 14 is a diagram illustrating an example of a computer used to implement the analysis device by executing a program.

FIG. 14 is a diagram illustrating an example of a computer used to implement the analysis device by executing a program. A computer 1000 includes, for example, a memory 1010 and a CPU 1020. Furthermore, the computer 1000 includes a hard disk drive interface 1030, a disk drive interface 1040, a serial port interface 1050, a video adapter 1060, and a network interface 1070. Each of the devices is connected by a bus 1080.

The memory 1010 includes a read only memory (ROM) 1011 and a random access memory (RAM) 1012. The ROM 1011 stores therein a boot program, such as Basic Input Output System (BIOS). The hard disk drive interface 1030 is connected to a hard disk drive 1090. The disk drive interface 1040 is connected to a disk drive 1100. For example, an attachable and detachable storage medium, such as a magnetic disk or an optical disk, is inserted into the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and program data 1094. Namely, the program that determines each of the processes performed by the analysis device is installed as the program module 1093 in which codes that can be executed by a computer are described. The program module 1093 is stored in, for example, the hard disk drive 1090. For example, the program module 1093 that is used to execute the same process as that performed by the analysis device having the functional configuration is stored in the hard disk drive 1090. The hard disk drive 1090 may also be replaced by a solid state drive (SSD).

Furthermore, the setting data used in the process performed in the above described embodiment is stored in, as the program data 1094, for example, the memory 1010 or the hard disk drive 1090. Then, the CPU 1020 reads, to the RAM 1012 as needed, the program module 1093 or the program data 1094 stored in the memory 1010 or the hard disk drive 1090.

Furthermore, the program module 1093 and the program data 1094 may also be stored in, instead of the hard disk drive 1090, for example, a removable storage medium and read by the CPU 1020 via the disk drive 1100 or the like. Alternatively, the program module 1093 and the program data 1094 may also be stored in another computer connected via a network (a local area network (LAN), a wide area network (WAN), etc.). Then, the program module 1093 and the program data 1094 may also be read, from the computer, by the CPU 1020 via the network interface 1070.

REFERENCE SIGNS LIST 1, 2, 3, 4 network
10 analysis device
11 control unit
12 storage unit
20, 30, 40 data relay device
21, 31 server monitoring function
111 collecting unit
112 network standpoint feature value creating unit
113 access source detection unit
114 point standpoint feature value creating unit
115 access detection unit
121 access source storage unit
122 access storage unit
201, 202, 301, 302 user Web server
211, 212 decoy Web server
401 attacker terminal

The invention claimed is:

1. An analysis method performed by an analysis device, the analysis method comprising:
a network standpoint feature value creating step of classifying first access data that is collected at a plurality of observation points in a network, that are each data relay devices that are separate from a source or destination of each of the first access data, and that is related to an access to a server in the network into each detection target access source that is an access source of the access and creating network standpoint feature values that are feature values of the first access data for each of the detection target access sources;
an access source detecting step of detecting, based on the network standpoint feature values, from among the detection target access sources, whether an access source that performs a predetermined continuous access performs a first type of continued access which is a known vulnerability scan that checks vulnerability of web sites or performs a second type of continuous access which is normal communication by a crawler;
a point standpoint feature value creating step of creating detection target standpoint feature values that are feature values for each piece of second access data that is collected at a single observation point in the network, that is a data relay device that is separate from a source or destination of each of the second access data, and that is related to an unknown access to a server in the network, and
training standpoint feature values that are feature values for each piece of the first access data in which, from among pieces of the first access data, an access source is the access source detected at the access source detecting step;
an access detecting step of detecting, from among pieces of the second access data, an access source, that performs the unknown access to the server and in which the similarity between the detection target standpoint feature value and the training standpoint feature value is equal to or greater than a predetermined value, as an access source that performs the first type of continued access; and
a storing step of storing the detected access source that performs the first type of continued access in a memory.

2. The analysis method according to claim 1, wherein the network standpoint feature value creating step includes using one of a transmission source address, an address block, and an address management company of a packet as the detection target access source and including, in the network standpoint feature value, at least one of statistical information on packet sizes, statistical information on packet arrival intervals, statistical information on the number of packets, statistical information on port numbers, continuity of port numbers, and continuity of destination addresses, and
the point standpoint feature value creating step includes including, in each of the detection target standpoint feature values and each of the training standpoint feature values, at least one of a set of a request field, a header field, and a body field in an HTTP request message, a set of a request field, a header field, and a body field in an HTTP response message, address information on a packet, and port number information on the packet.

3. The analysis method according to claim 1, wherein the access source detecting step includes detecting, from among the detection target access sources, an access source in which the similarity between the network standpoint feature value and a training network standpoint feature value that is created from access data related to an access performed by a known access source that performs the second type of continued access as access source that performs the second type of continuous access.

4. An analysis device comprising: a memory; and a processor coupled to the memory and programmed to execute a process comprising:

classifying first access data that is collected at a plurality of observation points in a network, that are each data relay devices that are separate from a source or destination of each of the first access data, and that is related to an access to a server in the network into each detection target access source that is an access source of the access and creating network standpoint feature values that are feature values of the first access data for each of the detection target access sources;

detecting, based on the network standpoint feature values, from among the detection target access sources, whether an access source that performs a predetermined continuous access performs a first type of continued access which is a known vulnerability scan that checks vulnerability of web sites or performs a second type of continuous access which is normal communication by a crawler;

creating detection target standpoint feature values that are feature values for each piece of second access data that is collected at a single observation point in the network, that is a data relay device that is separate from a source or destination of each of the second access data, and that is related to an unknown access to a server in the network, and training standpoint feature values that are feature values for each piece of the first access data in which, from among pieces of the first access data, an access source is the access source detected by the detecting;

detecting, from among pieces of the second access data, an access source, that performs the unknown access to the server and in which the similarity between the detection target standpoint feature value and the training standpoint feature value is equal to or greater than a predetermined value, as an access source that performs the first type of continued access; and storing the detected access source that performs the first type of continued access in a memory.

5. A non-transitory computer-readable recording medium having stored an analysis program that causes a computer to execute a process comprising:

a network standpoint feature value creating step of classifying first access data that is collected at a plurality of observation points in a network, that are each data relay devices that are separate from a source or destination of each of the first access data, and that is related to an access to a server in the network into each detection target access source that is an access source of the access and creating network standpoint feature values that are feature values of the first access data for each of the detection target access sources;

an access source detecting step of detecting, based on the network standpoint feature values, from among the detection target access sources, whether an access source that performs a predetermined continuous access performs a first type of continued access which is a known vulnerability scan that checks vulnerability of web sites or performs a second type of continuous access which is normal communication by a crawler;

a point standpoint feature value creating step of creating detection target standpoint feature values that are feature values for each piece of second access data that is collected at a single observation point in the network, that is a data relay device that is separate from a source or destination of each of the second access data, and that is related to an unknown access to a server in the network, and training standpoint feature values that are feature values for each piece of the first access data in which, from among pieces of the first access data, an access source is the access source detected at the access source detecting step;

an access detecting step of detecting, from among pieces of the second access data, an access source, that performs the unknown access to the server and in which the similarity between the detection target standpoint feature value and the training standpoint feature value is equal to or greater than a predetermined value, as an access source that performs the first type of continued access; and a storing step of storing the detected access source that performs the first type of continued access in a memory.

* * * * *